(12) United States Patent
Ventilla et al.

(10) Patent No.: US 8,515,888 B2
(45) Date of Patent: Aug. 20, 2013

(54) AFFILIATE LINKING WHERE ANSWERER REQUESTS PERMISSION TO INSERT AN INTERACTIVE LINK IN AN ANSWER

(75) Inventors: Max Ventilla, San Francisco, CA (US); Damon Horowitz, San Francisco, CA (US); Robert J. Spiro, San Francisco, CA (US); Nathan Stoll, San Francisco, CA (US)

(73) Assignee: Google Inc., Mountain View, CA (US)

( * ) Notice: Subject to any disclaimer, the term of this patent is extended or adjusted under 35 U.S.C. 154(b) by 291 days.

(21) Appl. No.: 12/915,654

(22) Filed: Oct. 29, 2010

(65) Prior Publication Data

US 2011/0106746 A1    May 5, 2011

Related U.S. Application Data

(60) Provisional application No. 61/256,324, filed on Oct. 30, 2009, provisional application No. 61/256,325, filed on Oct. 30, 2009.

(51) Int. Cl.
*G06F 17/00*    (2006.01)

(52) U.S. Cl.
USPC .......................................................... 706/45

(58) Field of Classification Search
USPC ............................................. 706/12, 45, 62
See application file for complete search history.

(56) References Cited

U.S. PATENT DOCUMENTS

| | | | |
|---|---|---|---|
| 7,788,260 B2 | 8/2010 | Lunt et al. | |
| 8,135,609 B2 | 3/2012 | Britt et al. | |
| 8,275,803 B2 * | 9/2012 | Brown et al. | 707/802 |
| 8,295,465 B2 | 10/2012 | Altberg et al. | |
| 2002/0169595 A1 * | 11/2002 | Agichtein et al. | 704/9 |
| 2005/0256866 A1 | 11/2005 | Lu et al. | |
| 2008/0114755 A1 * | 5/2008 | Wolters et al. | 707/5 |
| 2009/0089126 A1 * | 4/2009 | Odubiyi | 705/7 |
| 2009/0162824 A1 * | 6/2009 | Heck | 434/322 |
| 2009/0228458 A1 * | 9/2009 | Imielinski | 707/3 |
| 2009/0265317 A1 * | 10/2009 | Buehrer et al. | 707/3 |
| 2010/0057712 A1 | 3/2010 | Ranganathan | |
| 2010/0106668 A1 | 4/2010 | Hawthorne et al. | |
| 2010/0125605 A1 * | 5/2010 | Nair et al. | 707/784 |

(Continued)

FOREIGN PATENT DOCUMENTS

WO    2007/052285    5/2007

OTHER PUBLICATIONS

Trice et al., Consensus Knowledge Acquisition, 1989, MIT, pp. 1-25.*

(Continued)

*Primary Examiner* — David Vincent
(74) *Attorney, Agent, or Firm* — Fish & Richardson P.C.

(57) ABSTRACT

Methods, systems, and apparatus, including computer programs encoded on a computer storage medium, for a social search engine. In one aspect, a method includes receiving an answer to a question from an answerer; identifying an entity in the answer, in which the entity refers to a product, a service, a company, or a merchant; obtaining permission from the answerer to provide an interactive link for the entity in the answer to a resource from which the entity can be obtained; receiving a user submitted query and determining that the query is related to the entity; and responsive to determining, providing the answer, including the link to the resource, as part of search results that are responsive to the query.

25 Claims, 7 Drawing Sheets

(56) References Cited

U.S. PATENT DOCUMENTS

| | | | |
|---|---|---|---|
| 2010/0198757 A1* | 8/2010 | Cheng et al. | 706/12 |
| 2010/0223212 A1* | 9/2010 | Manolescu et al. | 706/12 |
| 2011/0106895 A1 | 5/2011 | Ventilla et al. | |
| 2011/0307478 A1* | 12/2011 | Pinckney et al. | 707/724 |

OTHER PUBLICATIONS

Banerjee, et al., A Social Query Model for Decentralized Search., In SNAKDD, 2008.

Bechar-Israeli., From <Bonehead> to <cLoNehEAd>: Nicknames, Play, and Identity on Internet Relay Chat. Journal of Computer-Mediated Communication, 1995.

Bietzel, et al., Hourly analysis of a very large topically categorized web query log. In SIGIR, 2004.

Brin and Page, The anatomy of a large-scale hypertextual Web search engine. In WWW, 1998.

Condie, et al., Adaptive peer-to-peer topologies. In P2P Computing, 2004.

Davitz, et al., iLink: Search and Routing in Social Networks. In KDD, 2007.

Dennis, et al., Testing media richness theory in the new media: The effects of cues, feedback, and task equivocality. Information Systems Research, 1998.

J.Donath. Identity and deception in the virtual community. Communities in Cyberspace, 1998.

Evans, et al., Towards a Model of Understanding Social Search. In CSCW, 2008.

Faye, et al., Semantic Query Routing in SenPeer, a P2P Data Management System. In NBiS, 2007.

Gyongyi, et al., Questioning Yahoo! Answers. In WWW Workshop on Question Answering on the Web, 2008.

Hoffman, T. Probabilistic latent semantic indexing. In SIGIR, 1999.

Horowitz, et al., "The Anatomy of a Large-Scale Social Search Engine"., WWW2010, April. 2630, 2010, Raleigh, North Carolina. 10 pages.

Jansen, et al., Sarcevic. Real life, real users, and real needs: a study and analysis of user queries on the web. Information Processing and Management, 2000.

Kamvar, et al., Computers and iPhones and Mobile Phones, Oh My!: a Logs-based Comparison of Search Users on Different Devices. In WWW, 2009.

Kamvar, et al., The EigenTrust Algorithm for Reputation Management in P2P Networks. In WWW, 2003.

Klein, et al., Combining heterogeneous classifiers for word-sense disambiguation. In SENSEVAL, 2002.

Morris, et al., What do people ask their social networks, and why? A Survey study of status message Q&A behavior. In CHI, 2010.

Page, et al., The PageRank citation ranking: Bringing order to the Web. Stanford University Technical Report, 1998.

Silverstein, et al., Analysis of a very large Web search engine query log. In SIGIR Forum, 1999.

Spink, et al., From e-sex to e-commerce: Web search changes. IEEE Computer, 2002.

Sproll, et al,. In Global Networks:Computers and International Communication. MIT Press, 1993.

Welsch, M. An anthropological introduction to YouTube. Library of Congress, 2008.

* cited by examiner

AFFILIATE LINKING WHERE ANSWERER REQUESTS PERMISSION TO INSERT AN INTERACTIVE LINK IN AN ANSWER

CROSS-REFERENCE TO RELATED APPLICATIONS

This application claims the benefit under 35 U.S.C. §119 (e) of U.S. Patent Application No. 61/256,324, entitled "REAL TIME, INTERACTIVE ANSWERS IN A SOCIAL NETWORK ENVIRONMENT," filed Oct. 30, 2009, which is incorporated herein by reference in its entirety.

This application claims the benefit under 35 U.S.C. §119 (e) of U.S. Patent Application No. 61/256,325, entitled "METHOD FOR GENERATING AFFILIATE REVENUE IN AN ONLINE MESSAGING SERVICE," filed Oct. 30, 2009, which is incorporated herein by reference in its entirety.

BACKGROUND

This specification describes technologies relating to question and answer services.

Traditionally, the basic paradigm in information retrieval has been the library. While this paradigm has worked well in several contexts, it ignores an age-old model for knowledge acquisition, which we shall call "the village paradigm". In a village, knowledge dissemination is achieved socially—information is passed from person to person, and the retrieval task consists of finding the right person, rather than the right document, to answer a question.

In a library, people use keywords to search, the knowledge base is created by a small number of content publishers before the questions are asked, and trust is based on authority. In a village, by contrast, people use natural language to ask questions, answers are generated in real-time by those in the community, and trust is based on intimacy. Real-time responses from socially proximal responders tend to elicit (and work well for) highly contextualized and subjective queries. For example, the following question is better answered by a friend than the library: "Do you have any good babysitter recommendations in Palo Alto for my 6-year-old twins? I'm looking for somebody that won't let them watch TV."

SUMMARY

For situations in which the systems discussed here collect personal information about users, the users may be provided with an opportunity to opt in/out of programs or features that may collect personal information (e.g., information about a user's preferences or a user's current location). A user may also be informed of the accompanying limitations on the functionality of a service that may result from limiting access to such personal information. In addition, certain data may be anonymized in one or more ways before it is stored or used, so that personally identifiable information is removed. For example, a user's identity may be anonymized so that the no personally identifiable information can be determined for the user, or a user's geographic location may be generalized where location information is obtained (such as to a city, zip code, or state level), so that a particular location of a user cannot be determined. In addition, some users may not want to be associated with a certain topic for which they provide answers. In these cases, the users' privacy can be protected by providing minimal or no information that would identify the users. Users can control how much identifying information is provided with their answers.

In general, one innovative aspect of the subject matter described in this specification can be embodied in methods that include the actions of receiving an answer to a question from an answerer; identifying an entity in the answer, in which the entity refers to a product, a service, a company, or a merchant; obtaining permission from the answerer to provide an interactive link for the entity in the answer to a resource from which the entity can be obtained; receiving a user submitted query and determining that the query is related to the entity; and responsive to determining, providing the answer, including the link to the resource, as part of search results that are responsive to the query. Other embodiments of this aspect include corresponding systems, apparatus, and computer programs, configured to perform the actions of the methods, encoded on computer storage devices.

These and other embodiments can each optionally include one or more of the following features. Identifying the entity in the answer can further comprise using a trained classifier to determine if the answer refers to an entity. Obtaining permission can further comprise providing one or more options to the answerer in which one of the options is to include the interactive link. Selection of the option to include the interactive link can be received. The resource can be a website or an application. The interactive link can be a hyperlink. The interactive link can include an affiliate code. The affiliate code can be used by the resource to identify an account. The account can receive credit if the entity is purchased. The provided answer can include an identity of the answerer. A resource is a website or an application. Providing the answer can further comprise including a map, an image or a video in the answer.

Particular embodiments of the subject matter described in this specification can be implemented so as to realize one or more of the following advantages. In various aspects, users can ask a question, either by instant message, email, web input, text message, or voice, for example. The system then routes the question to a person in the user's social affinity group most likely to be able to answer that question. Potential answers may choose not to answer a question in order to protect their privacy, or they may choose to answer but opt to provide only minimal or no information that identifies them to others.

As compared to a traditional web search engine, where the challenge lies in finding the right document to satisfy a user's information need, the challenge in a social search engine is to find the right person to satisfy a user's information need. Further, while trust in a traditional search engine can be based on authority, in a social search engine trust is based on intimacy. Other advantages include the ability to ask questions in natural language, the ability to receive a useful answer even if the question does not include identifiable or relevant topics, and the ability to receive more information than a specific answer to a question.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

As used in this specification, a social affinity group of a user is a group of other users with whom the user has relationships known by a system. The relationships can be implicit or explicit, and in either case the relationships identify the group of users and the user as a proper subset of users of a network. Examples of groups identified by explicit relationships include users belonging to a "friends lists" of a user in a social network, users that are "linked to" a user in a professional network, and users that otherwise explicitly identify themselves as belonging to a group so as to form a group that is distinct from the larger group of all users. Other types of explicit relationships are possible. Examples of groups identified by implicit relationships include users located near a common location (e.g., users within a predefined distance of a city center), users that have opined on a particular product or article (e.g., users that have provided a review for a particular product) and users that are otherwise implicitly identified so as to form a group that is distinct from the larger group of all users. Other types of implicit relationships are possible. A degree of social indirection between a user and a member of the user's social affinity group is a number of intermediate relationships between the two. For example, in the case of explicit "friend list" type relationships, the degree of social indirection is 0 if the member is the user's friend, 1 if the member is a friend of a friend of the user, 2 if the member is a friend of a friend of a friend of the user, and so on. The same applies for implicit relationships and combinations of implicit and explicit types of relationships. If two users have a degree of social indirection between them that is greater than zero, the nature of their relationship may depend on the nature of their relationships with users to whom they are both related. For example, if user A and user B have a degree of social indirection of 4 and both user A and user B have a relationship with user C, if user C has a lower degree of social indirection to user A than user A has to user B, user A's trust of user B could be based on user B's relationship with user C. That is, if user B also has a close relationship to user C than user A is more likely to trust answers from user B. Other types of measures of social indirection are possible.

Figure 1A:
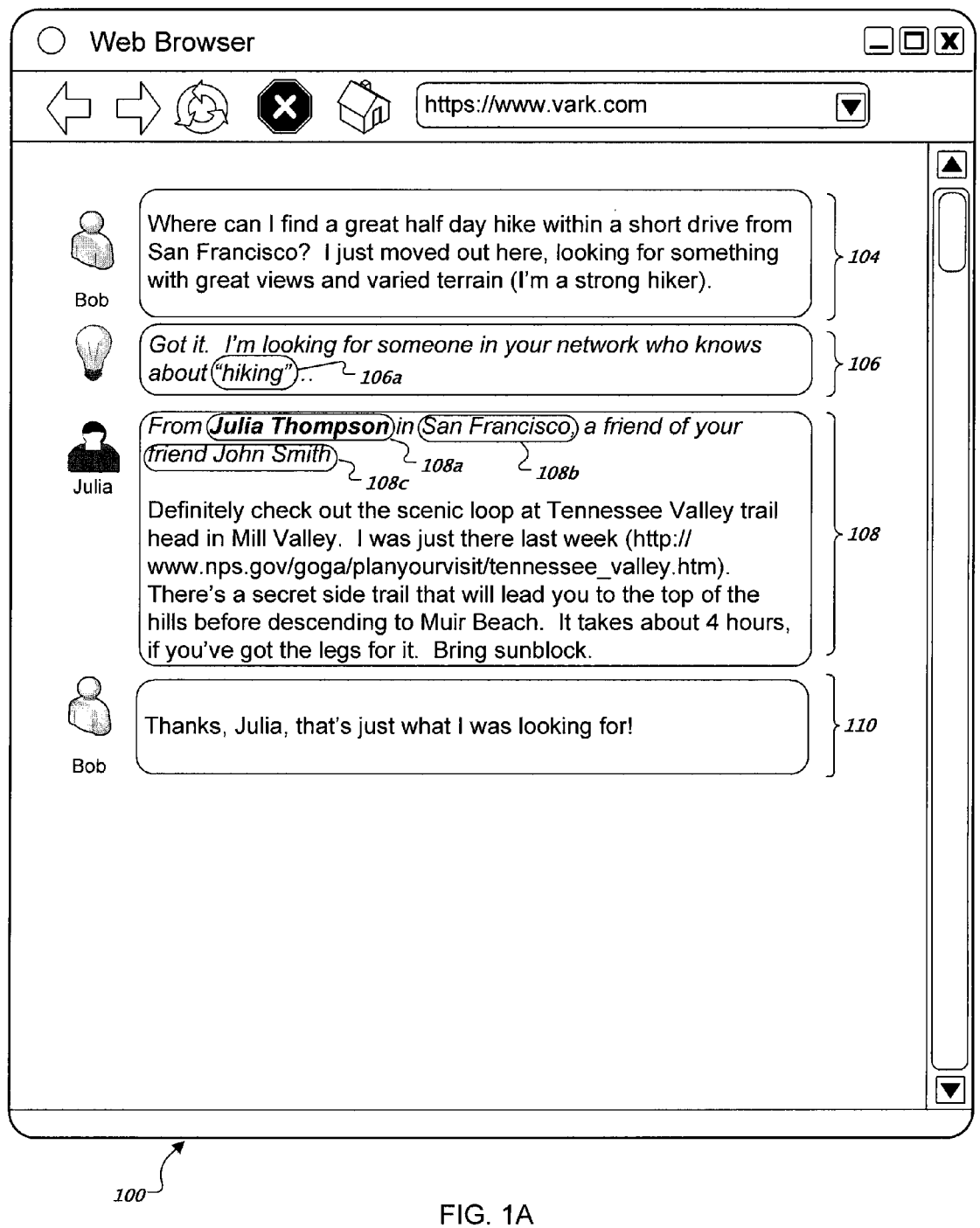
FIG. 1A illustrates an example graphical user interface for interacting with an asker.

FIG. 1A illustrates an example graphical user interface (GUI) 100 for a user to pose questions and receive answers to questions from members of the user's social affinity group. Software implementing the GUI 100 can execute on a client device which is a data processing apparatus such as, for example, a personal computer, a smart phone, a tablet computer, a laptop computer, and so on. The GUI 100 can be presented by a web browser or by other software executing on the client device. Input to the GUI 100 can be by way of a physical or virtual keypad, voice, or video, for example. Other GUIs are possible, including GUIs for instant messaging, electronic mail, micro-blogging, and short message service, for example. In some implementations, a software application can register with one or more instant messaging services as a user. Such automated users of instant messaging services are commonly referred to as "bots". Users who have the bot in their contact list for a particular instant messaging service can send the bot questions. The bot can interact with the system (see FIG. 2 below) in order to convey the question to the system and relay the answer from the system to the user.

By way of illustration, a user Bob submits a question to the system as shown in 104. In some implementations, the question is submitted as text, voice, video, or a combination of these. The question can also include one or more attachments, such as images, sound recordings, video, or documents, for example. Next, the system responds with message 106 indicating that the system is looking for someone in Bob's social affinity group who can answer the question. (Messages to users from the system 200 are generated by the conversation manager 206, described further below in reference to FIG. 2.) Notice that the system has identified a topic 106a of the question. Generally speaking, the system can identify one or more topics for each submitted question. Topic identification is described further below. The system identifies members of Bob's social affinity group who have a level expertise in the identified topic(s) and who are likely to provide an answer as potential answerers. One or more of the potential answers are contacted by the system over communication channels (e.g., instant message, electronic mail, blog post, short message service message, and so on) appropriate for the potential answer. An example of an interaction with a potential answer is described in relation to FIG. 1B, below. When one of the potential answers responds to the system with an answer, the system presents message 108 which includes the answer along with, in some implementations, information identifying the answerer as a member of the user's social affinity group.

Answers can come from members of the user's social affinity group that have different relationships to the asker. For instance, one answer may come from someone with only a distant social connection to the asker (i.e., a high degree of social indirection); a second answer may come from a coworker; and a third answer may come from a friend-of-friend-of-friend. In some implementations, the information identifying the answerer in the answer includes the answerer's full or partial name 108a, the answerer's age, their location 108b (e.g., city, state, country, region, and so on), and a description of a social affinity group relationship between the asker and the particular answerer 108c. In some implementations, the description of a social affinity group relationship between the asker and the particular answerer identifies a friend in common that the asker is closest to (from a social indirection standpoint).

Some or all of the information describing the answerer can be omitted (e.g., at the request of the answerer), but providing this information can facilitate trust in the answer. In this illustration, the question was answered by Julia Thompson who is in San Francisco and is a friend of the user's friend John Smith. In some implementations, askers and/or answerers can opt-in or opt-out of providing information with their messages that would identify them. Alternatively, askers and/or answerers can limit the amount of identifying information that is provided with their messages. By limiting the identifying information to a user's initials, their state, and a level of social indirection (e.g., "K. from California is a friend of a friend of yours"), for example, users can strike a balance between maintaining their anonymity and gaining the trust of the recipient of their message.

In some implementations, the system allows the user to communicate directly with the answerer in order to, for example, thank the answerer, request clarifying information or follow-up with another question (110). In various implementations, the conversation manager 206, described below, facilitates such communication. Throughout all of the user/answerer interactions, the system maintains a tone of voice which is friendly, polite, and appreciative. The system relies upon the goodwill and interest of its users, so it is important to demonstrate the kind of (linguistic) behavior that can encourage these sentiments, in order to set a good example for users to adopt.

Figure 1B:
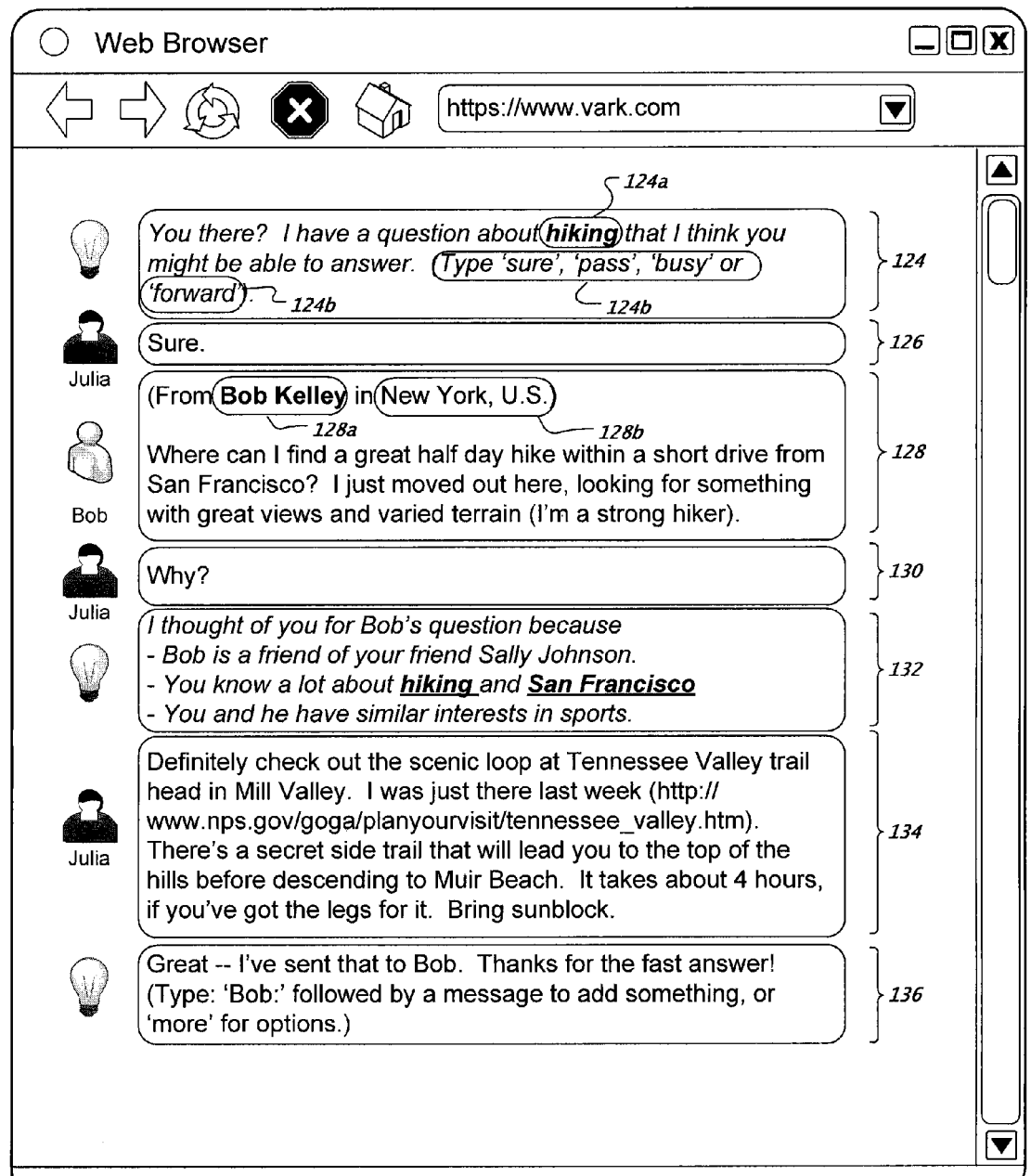
FIG. 1B illustrates an example graphical user interface for interacting with an answerer.

FIG. 1B illustrates an example GUI 120 for interacting with an answerer. Software implementing the GUI 120 can execute on a client device, for example. The GUI 120 can be presented by a web browser or by other software executing on the client device. Input to the GUI 120 can be by way of a physical or virtual keypad, voice, or video, for example. Other GUIs are possible, including GUIs for instant messaging, electronic mail, micro-blogging, and short message service, for example. A candidate answerer for a question is selected based on the potential answer's membership in the question asker's social affinity group and one or more topics for the question, for example. (Selection of potential answers is described further below.) In this illustration, the system has identified Julia Thompson as one of the candidate answerers. The system presents Julia with the message 124 which asks if she is available and able to answer a question regarding the identified topic(s) of the question which, in this instance, includes the topic "hiking" 124a. Julia is given the options to answer (e.g., by typing or speaking "sure"), not answer (e.g., by typing or speaking "pass"), or forward the question to someone else in Julia's or the asker's social affinity group (e.g., by typing or speaking "forward"). In this example, Julia has typed "sure" 126 indicating that she is willing to answer the question regarding hiking. There is no shame in "passing" or "forwarding" a question, since nobody else knows that the question was sent to the potential answerer. Similarly, there is no social cost to the user in asking a question, since the user is not directly imposing on a friend or requesting a favor; rather, the system plays the role of the intermediary who bears this social cost.

A key benefit of this interaction model is that the available set of candidate answerers is not just whatever users happen to be online at the time a question is posted, but rather, the entire set of members of a user's social affinity group that the system has contact information for. Because this kind of "reaching out" to candidate answerers has the potential to become an unwelcome interruption if it happens too frequently, in some implementations the system sends such requests usually less than once a day to a given candidate answerer. In further implementations, users can easily change their contact settings, specifying preferred frequency and time-of-day for such requests.

The system then presents the question 128 to Julia. In some implementations, the question includes information describing the asker such as the asker's name 128a, age, and location 128b. In some implementations, the description of a social affinity group relationship between the answerer and the particular asker is provided. This information can include a friend in common that the answerer is closest to (from a social indirection standpoint). The information can also include the social relationship between the asker and the answerer. Some or all of the information describing the asker can be omitted (e.g., at the request of the asker) but, as mentioned previously, providing this information can facilitate trust between users of the system.

The potential answerer can ask the system 130 why they were chosen to answer the question (e.g., by typing or speaking "Why?") and indicate a preference to the system that they do not want such questions in the future. This is like the real-world model of social information sharing: the person asking a question, or the intermediary in the system's role, is careful not to impose too much upon a possible answerer. The system responds with detailed information 132 regarding why the candidate answerer was chosen. This information 132 can include the social relationship between the candidate answerer and the asker ("Bob is a friend of your friend Sally Johnson"), the relevance of the question's topic(s) to the candidate answerer ("You know a lot about hiking and San Francisco"), and identification of similar interests between the asker and the answerer ("You and he have similar interests in sports."), for example. After reviewing this information, the candidate answerer can still decline to answer or forward the question to another user if they so desire.

Julia then provides an answer 134 to the question which is routed by the conversation manager 206 to the asker (e.g., Bob; see 108 in FIG. 1). The answer can include one or more of text, a Uniform Resource Locator (URL), an image, audio content, a video, an attached file, and other content, for example. The system then presents a message 136 thanking Julia for answering the question (and acknowledging if she had answered the question quickly). Julia can then correspond directly with the asker Bob, if she so chooses, by typing or speaking his name followed be a message. In some implementations, a user can participate in multiple question and answer conversations simultaneously. In these implementations, the multiple conversations could be visually separated (e.g., in separate windows) in a graphical user interface so that the user would not need to explicitly tell the system who they wish to communicate with.

Figure 1C:
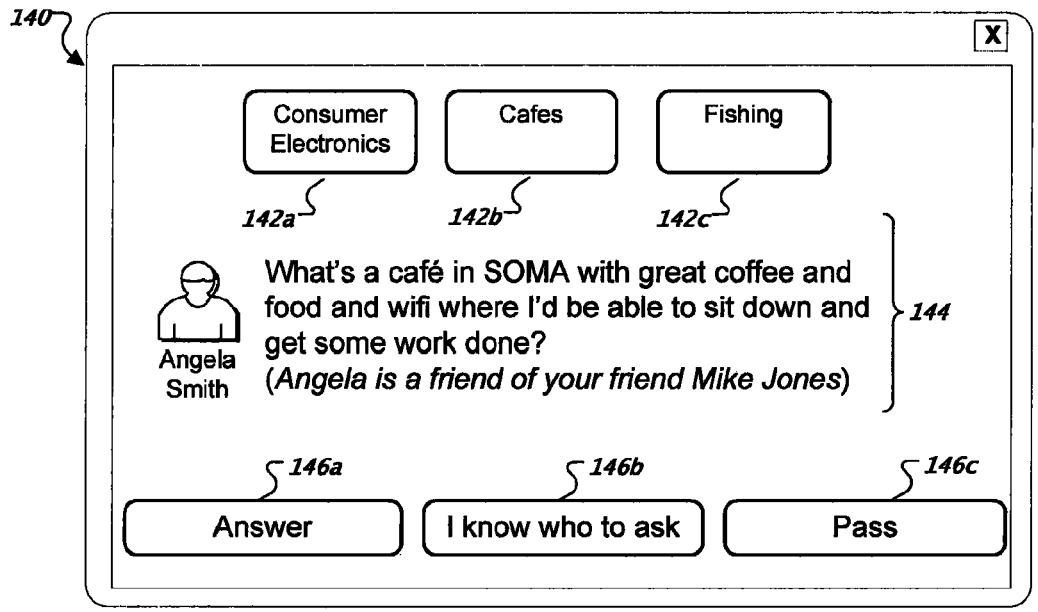
FIG. 1C illustrates another example graphical user interface for interacting with an answerer.

FIG. 1C illustrates another example GUI 140 for interacting with an answerer. In some implementations, there are two interaction flows available for answering a question. One flow involves the system sending a candidate answerer a message (as illustrated above in regards to FIG. 1B). A secondary flow of answering questions is similar to bulletin-board style interactions: a user sends a message to the system (e.g., "try"), and the system presents the user with a recent question from their social affinity group which has not yet been answered and is related to topics for which the user has expertise. This mode involves the user initiating the exchange when the user is in the mood to try to answer a question; as such, it has the benefit of an eager candidate answerer. The GUI 140 includes a sampling of topics 142a-c. In some implementations, the topics are selected in order to develop information regarding the expertise of the user. For example, if a user has indicated that they have expertise in topic A but has not answered any questions related to this topic in a recent time frame or ever, the sampling of topics can include topic A so that the system can identify if the user is still willing to answer questions regarding topic A. Selection of a topic (e.g., topic 142b "cafes") causes the presentation of a question 144 for the topic and, optionally, information that identifies the particular asker. The information can include the asker's name ("Angela Smith") and their social relationship to the answerer ("a friend of your friend Mike Jones"), for example. Other information such as the asker's age and location can be included. In addition, any or all of the information identifying the asker can be omitted. The user can submit an answer to the question 144 by selecting the Answer button 146a. Or, the user can inform the system of another who is better able to answer the question by selecting button 146b. Finally, the user can decline to answer the question by selecting button 146c. In some implementations, the user can answer as many questions as they like. In such implementations the sampling of topics can change over time as questions are answered.

Figure 1D:
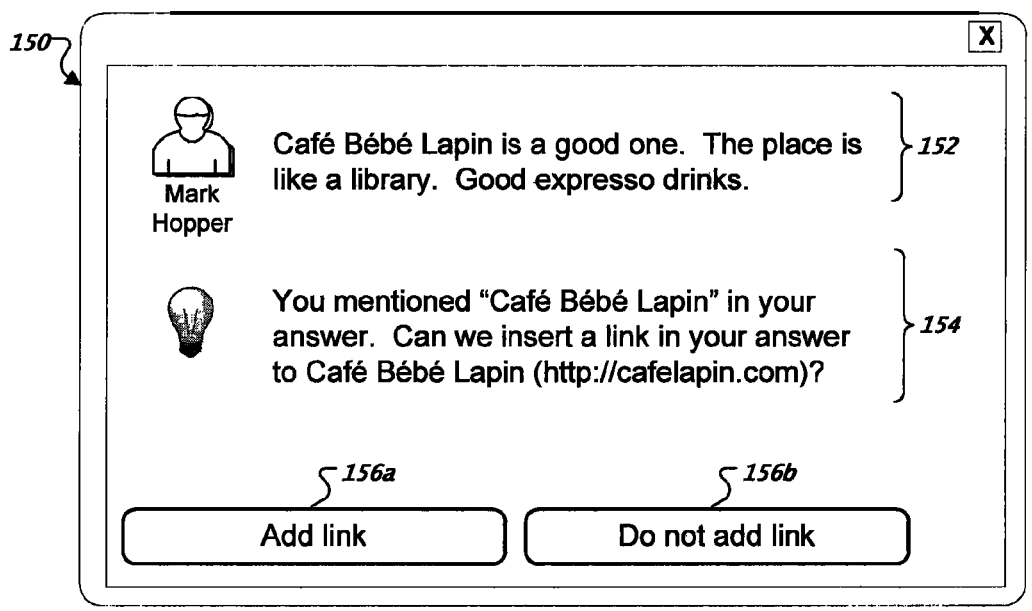
FIG. 1D illustrates an example graphical user interface for obtaining permission to insert an affiliate link in an answer.

FIG. 1D illustrates an example GUI 150 for obtaining permission to insert an affiliate link in an answer. The GUI 150 allows the system to insert one or more affiliate links in an answer if permission is given by the answerer. In other implementations, the system can automatically insert one or more affiliate links into the answer without obtaining permission from the answerer. In so-called affiliate marketing, a content provider is compensated when a customer that it delivered to a merchant website makes a purchase after linking from the content provider's website or application (as opposed to, for example, returning to the merchant website a week later to make a purchase, in which case the content provider receives no commission). This allows web merchants to efficiently market and sell goods in cooperation with content providers or other business partners, referred to herein as "affiliates."

Through the merchant's website, for example, a content provider can enroll as an affiliate, and can then disseminate hyperlinks (or other types of interactive links) containing affiliate tags. Content providers publish hyperlinks (or other types of interactive links) containing affiliate tags that allow potential customers to link to the merchant's website to initiate purchases of products or services from the merchant. Affiliate tags allow merchants to identify the website or software application of origin for users who execute a purchase and compensate the associated affiliate. In various implementations, the affiliate tag includes a unique identifier of the affiliate (e.g., assigned upon enrollment) and, optionally, the unique identifier of the selected product or service. Software implemented on the merchant website uses this information to identify the affiliate that referred the customer to the merchant site. If the customer subsequently purchases the selected product from the merchant site (e.g., by filling out an order form page and submitting the order), software automatically credits the referring affiliate for the referral by, for example, applying a commission to an affiliate account. The referral commission can be automatically generated based on a fixed percentage of the merchant's selling price, and is paid to the affiliate electronically on a periodic basis, for instance.

Referring again to FIG. 1D, an answerer has provided an answer 152 to question 144. The question can be provided to the user as described above in relation to FIGS. 1B and 1C, for example. The system identifies one or more entities (i.e., products, services, company names, merchant names) referred to in the answer. An entity can be referred to by natural language text (e.g., "Nikon D3X") or the entity can be referred to by a URL (http://www.nikon.com/25442/D3X.html), for example. An entity can be specific or general. That is, an entity can identify a specific product, service, and/or company (e.g., "Joe & John's dark roast espresso") or the entity can be general (e.g., "espresso"). If the entity is specific, it can be linked to a resource (e.g., a merchant's website or application that sells the particular product or service). Otherwise, the entity can be linked to a resource that sells the category of product or service identified by the entity. By way of illustration, the system has identified the company "Café Bébé Lapin" in the answer 152. In further implementations, other content besides a link to a resource can be inserted in an answer such, for example, a map showing the location of the entity, user or customer ratings of the entity, images and video for the entity or the entity's products/services, and so on.

In some implementations, the system asks 152 the answerer if a link to the entity can be inserted into their answer before the answer is delivered to the asker. The answerer can approve the link assertion by selecting the button 156a, or decline the link insertion by selecting button 156b. If the link is allowed to be inserted, it is inserted with an affiliate code so that the system will receive credit for the referral if the asker selects the link and purchases the product or service. If an entity is referred to by a URL in the answer, the system can add an affiliate code to the URL.

The answer returned to the asker can include one or more words in the answer highlighted (e.g., underlined) indicating that they are linked to a corresponding entity (e.g., product or service) on a merchant website, or the answer can include a separate advertisement for a merchant that sells the entity. For example, the word "espresso" would be highlighted in the answer 152 returned to the user. User selection of the linked words or the advertisement will cause the user's application (e.g., web browser or other software application) to present the merchant's website with the entity in question. In some implementations, if the answerer has given permission to insert the affiliate link, the answer will indicate such to the asker. This may make it more likely that the asker will select the affiliate link knowing that the answerer, who has a social connection to them, approved the link. Affiliate links are described further below.

Figure 1E:
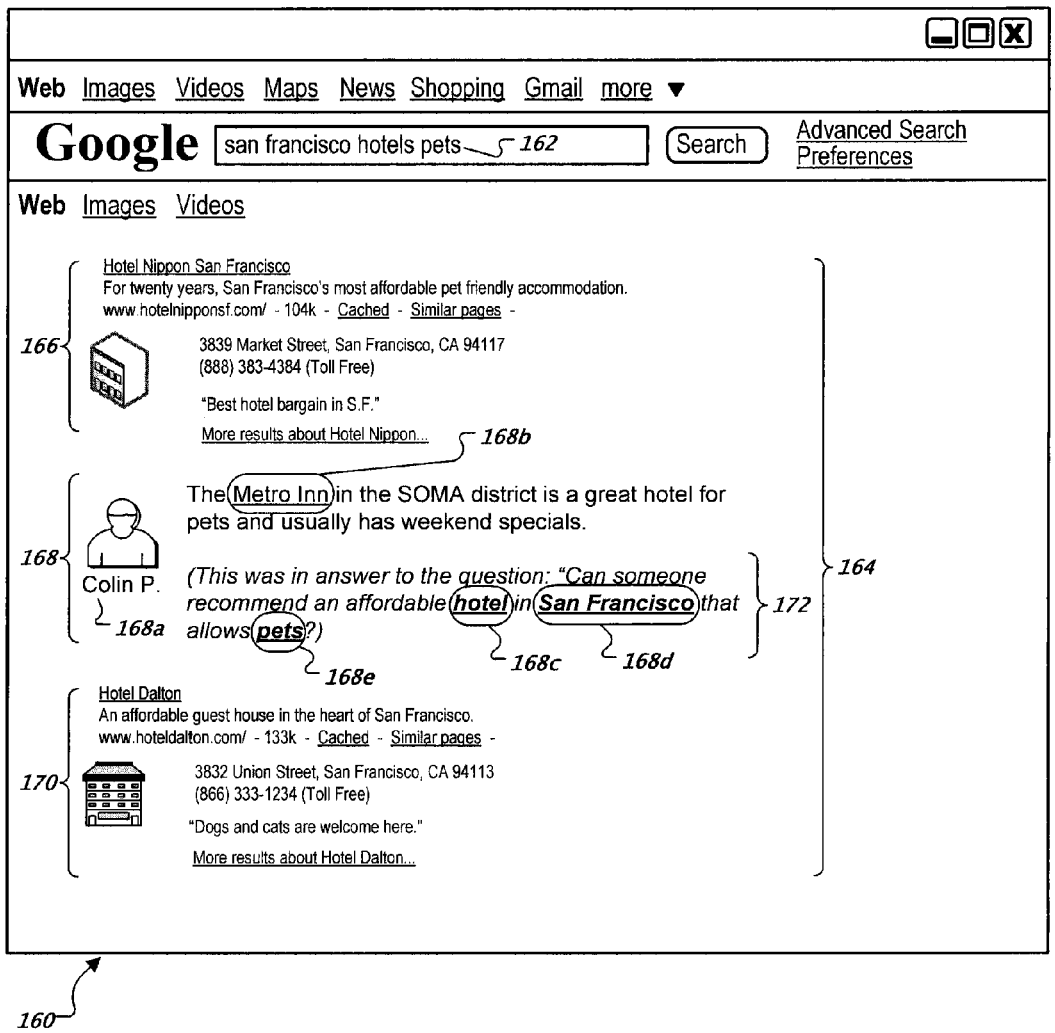
FIG. 1E illustrates an example graphical user interface for providing search results and answers in response to queries.

FIG. 1E illustrates an example GUI 160 for providing search results and answers in response to search engine queries. Software implementing the GUI 160 can execute on a client device, for example. The GUI 160 can be presented by a web browser or by other software executing on the client device. Input to the GUI 160 can be by way of a physical or virtual keypad, voice, or video, for example. Other GUIs are possible. A user submits a query 162 "san francisco hotel pets" to a search engine through the GUI 160 in order to find pet friendly hotels in San Francisco. The search engine can be an interne search engine or another type of system that can respond to queries.

Search results 164 responsive to query 162 "san francisco hotel pets" are presented to the user in the GUI 160. For instance, search result 166 is for the Hotel Nippon San Francisco and includes a snippet of information about the hotel include the URL of the hotel's website. Likewise, search result 170 is for the Hotel Dalton. Search result 168 is a previously submitted answer to a question that was deemed related to the topics of the search query 162. In some implementations, an explanation 172 is included in the answer 168 as to why the answer was deemed relevant to the search query 162. In this example, the explanation includes the original question with relevant topics highlighted: "hotel" 168c, "San Francisco" 168d, and "pets" 168e. Other types of explanations are possible, including ones that omit the original question. The answer 168 can include information 168a that identifies the user who answered the question if, for example, the answerer is in the social affinity group of the user who submitted the query 162. The answer 168 can also include affiliate links (e.g., affiliate link 168b which is a hyperlink to the website of the Metro Inn hotel).

Figure 2:
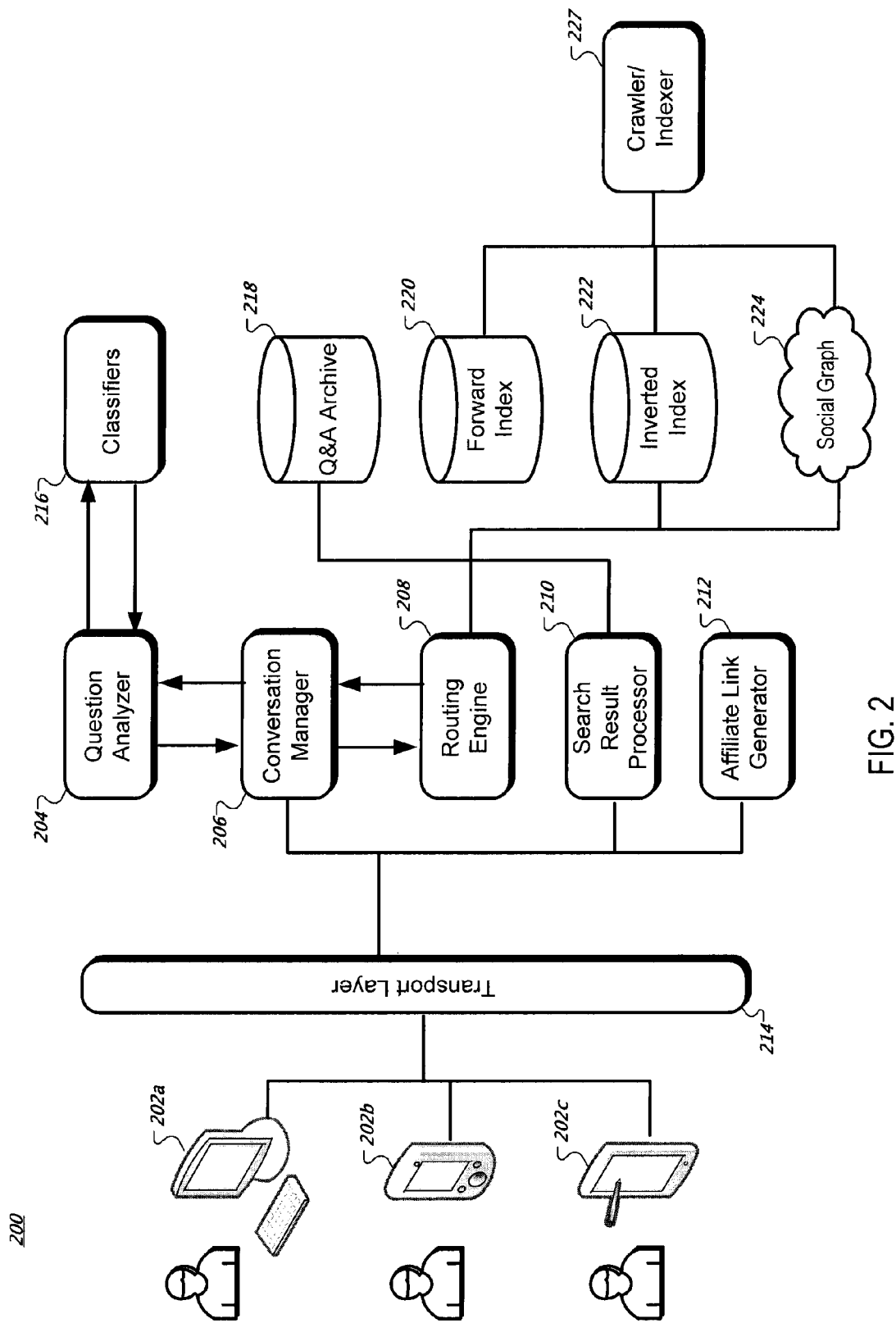
FIG. 2 is a schematic diagram of an example social search engine system.

FIG. 2 is a schematic diagram of an example social search engine system 200. In various implementations, the system includes one or more client devices (e.g., client devices 202a-202c), software components (e.g., transport layer 214, question analyzer 204, conversation manager 206, routing engine 208, search result processor 210, affiliate link generator 212, crawler/indexer 227 and classifiers 216), and one or more data stores (e.g., question and answer archive 218, forward index 220, inverted index 222, and social graph 224). The client devices are data processing apparatuses such as, for example, personal computers, smart phones, tablet computers, laptop computers, and so on. A software component is a computer program or module that can be executed by one or more data processing apparatuses in which the data processing apparatuses can be communicatively coupled by one or more networks. Data processing apparatuses that execute the software components can reside in different locations. Moreover, software components can be combined into fewer components or divided into additional components. The data stores comprise computer storage media coupled directly or indirectly (through one or more networks) to one or more of the data processing apparatuses that execute the software components. The data stored on the data stores can be stored in fewer data stores or stored in additional data stores.

The crawler/indexer 227 can perform a number of indexing steps for a new user in order to be able to direct appropriate questions to the user for answering. Because questions will be routed to members of the user's social affinity group, the first step involves indexing social affinity group information. The data structure responsible for this is the social graph 224. A new user has the option of connecting to commercial social affinity groups and importing members and relationships from the social affinity group into the social graph 224, or manually adding members and relationships to the social graph 224. The crawler/indexer 227 indexes this information and stores it in the social graph 222, which in some implementations can be a fixed width Indexed Sequential Access Method (ISAM) index sorted by user identifier.

The crawler/indexer 227 can also index the topics about which the new user has some level of knowledge or expertise. For example, topical expertise can be garnered from one or more of the following sources shown in TABLE 1. Other sources of topical expertise are possible.

TABLE 1

| Topic Source |
| --- |
| Topics explicitly provided by the user which they believe they have expertise about. |
| Topics explicitly provided by members of the user's social affinity group. |
| Topics parsed out from the user's existing profile for a social affinity group. |
| Topics parsed out from profile pages of the user that have a known structure. A simple topic parsing algorithm that uses regular expressions devised for specific fields in the profile pages can be used, for example. |
| Topics extracted from unstructured text on the user's existing online homepages or blogs, if provided. For unstructured text, a linear support vector machine (SVM) can be used to identify the general subject area of the text, while an ad-hoc named entity extractor can be used to extract more specific topics, scaled by a variant term frequency-inverse document frequency (tf-idf) score. |
| Topics extracted from the user's status message updates for their social affinity group, and from the messages they send to members of their social affinity group. |
| Topics extracted from images or videos associated with the user (e.g., posted to the user's social affinity group). For example, a picture or video a foreign landmark could imply an interest in travel or the city of the landmark. Topics can be extracted, for example, by associating objects identified in images with topic categories. |
| Topics gleaned from articles or web pages linked to by the user. |

A motivation for using these latter sources of topic information is a simple one: if you want to be able to predict what kind of content a user will generate, first examine the content they have generated in the past. In this spirit, the crawler/indexer 227 uses web content not as a source of existing answers about a topic, but rather, as an indicator of the topics about which a user is likely able to give new answers on demand. In essence, this involves modeling a user as a content-generator, with probabilities indicating the likelihood that the user will respond to questions about given topics.

Each topic t associated with a user $u_i$ has an associated score, depending upon the confidence appropriate to the source of the topic. In addition, the crawler/indexer 227 learns over time which topics not to send a user questions about by keeping track of cases when the user: (1) explicitly "mutes" a topic; (2) declines to answer questions about a topic when given the opportunity; (3) receives negative feedback on his answer about the topic from another user. The set of topics associated with a user is recorded in the forward index 220, which stores for each user, a scored list of topics, and a series of further scores about a user's behavior (e.g., responsiveness or answer quality). From the forward index 220, the crawler/indexer 227 constructs an inverted index 222. The inverted index 222 stores each topic and a scored list of users that have expertise in that topic. In addition to topics, the inverted index 222 stores scored lists of users for features like answer quality and response time. Once the inverted index 222 and the social graph 224 for a user are created, the user is now active on the system and ready to ask her first question.

The following high-level illustration follows the life of a question as it is processed by the system 200. A user (or "asker") of a client device, e.g., client device 202b, begins by posing a question to the system 200 through GUI 100 or through an instant messaging service bot, for example. The question is sent from the client device 202b to the transport layer 214, where it can then sent to the conversation manager 206. The transport layer 214 converts message formats to and from their external representation (e.g., electronic mail, short message service, instant message, and so on) to a normalized internal representation. Once the conversation manager 206 determines that the message is a question, the conversation manager 206 sends the question to the question analyzer 204. The question analyzer 204 determines one or more appropriate topic(s) for the question by analyzing the question.

In some implementations, the conversation manager 206 informs the asker of the topic(s) that were determined for the question, and provides the asker the opportunity to edit the topics. The conversation manager 206 issues a routing suggestion request to the routing engine 208. The routing engine 208 plays a role analogous to a ranking function in a corpus-based search engine. The routing engine 208 accesses the inverted index 222 and the social graph 224 for a list of candidate answerers, and ranks them to reflect how well the routing engine 208 believes they can answer the question, and how good of a match they are for the asker. The routing engine 208 returns a ranked list of routing suggestions to the conversation manager 206, which then contacts the candidate answerers in order to obtain an answer to the question. In some implementations, if a candidate answerer declines to answer a question or does so ineffectively (e.g., providing a terse or cryptic answer), the routing engine 208 can note such and potentially rank the user lower in future ranked lists of candidate answerers for the same or similar topics.

In some implementations, the conversation manager 206 contacts each candidate answerer in order of the ranking beginning with the highest ranked candidate answerer until one of the candidate answerers provides an answer. The conversation manager 206 can wait an amount of time before giving up on a given candidate answerer and moving on to the next one. (Note that an answer to a question can be received even after the conversation manager 206 has moved on to another candidate answerer.) By way of illustration, the amount of wait time can be based on the communication channel (e.g., instant message, electronic mail, blog post, short message service message, and so on). The wait time can be short (e.g., 30 seconds) if the communication channel is an instant message or short message server, or the wait time can be longer (e.g., two minutes) if the communication channel is electronic mail, for instance. The wait time can also be based on the candidate answerer's historical responsiveness for a given communication channel. For example, if a given candidate answer takes on average 10 minutes to respond to a question sent through electronic mail, the wait time can be adjusted in view of this. The wait time can be increased if, for example, the system determines that the quality of the social match between the asker and the answerer is high and would likely promote a good answer.

The asker and the answerer can use different communication channels. In some implementations, if the asker uses an instantaneous message channel such as instant messaging and the answerer does not provide an answer for long period of time, then the system can deliver the answer to the asker through a slower communication channel such as email, for example, rather than through instant messaging. In some implementations, the communication channel is selected to deliver a question or an answer is dependent on user preferences and/or the availability of both the asker and the answerer.

In other implementations, the conversation manager 206 contacts groups of two or more candidate answerers in order of the ranking beginning with the highest ranked candidate answerers until an answer is received. By way of illustration, assume the ranking of candidate answerers (from highest to lowest ranked) is A, B, C, D and E, and that the group size is two. The conversation manager 206 would contact candidate answerers A and B first and, if no answer is received from either A or B after a period of group wait time has passed, the conversation manager 206 would then contact C and D. If an answer is not received from C or D after a period of group wait time has passed, the conversation manager 206 would then contact candidate answer E. (Note that an answer to a question can be received even after the conversation manager 206 has moved on to another group of candidate answerers.) Candidate answerers in a group can be contacted in parallel in some implementations.

The amount of group wait time can be based on the communication channels used to contact the candidate answerers in a group such that the longest wait time is used. If candidate answerer A is contacted through electronic mail and candidate answerer B is contacted through short message service, for instance, the group wait time would be based on the slower response channel—e.g., electronic mail. The group wait time can also be based on the candidate answerers' historical responsiveness for the communication channels used in the group such that the group wait time is adjusted in view of the candidate answerer who is anticipated to take the longest amount of time to respond.

In various implementations, the routing engine 208 uses a statistical model for routing questions to candidate answerers. In some implementations, the statistical model is a variant of an aspect model and has two primary features. First, the model associates an unobserved class variable $t \in T$ with each observation (i.e., the successful answer of question q by user $u_i$). In other words, the probability $p(u_i|q)$ that user i will successfully answer question q depends on whether q is about the topics t in which $u_i$ has expertise:

$$p(u_i | q) = \sum_{t \in T} p(u_i | t) p(t | q) \quad (1)$$

A second feature of the model is that it defines a question-independent probability of success for each potential asker/answerer pair $(u_i, u_j)$, based upon their degree of social indirection and the similarity of their profiles. In other words, a probability $p(u_i|u_j)$ is defined that user $u_i$ will deliver a satisfying answer to user regardless of the question.

A scoring function $s(u_i, u_j, q)$ is defined as the composition of the two probabilities.

$$s(u_i, u_j, q) = p(u_i | u_j) \cdot p(u_i | q) = p(u_i | u_j) \sum_{t \in T} p(u_i | t) p(t | q) \quad (2)$$

The goal in the ranking problem is: given a question q from user $u_j$, return a ranked list of users $u_i \in U$ that maximizes $s(u_i, u_j, q)$.

Note that the scoring function is composed of a question-dependent relevance score $p(u_i|q)$ and a question-independent quality score $p(u_i|u_j)$. This bears similarity to the ranking functions of traditional corpus-based search engines. But unlike quality scores of traditional search engines, the quality score described herein aims to measure intimacy rather than authority. And unlike the relevance scores in corpus-based search engines, the relevance score described herein aims to measure a user's potential to answer a question, rather than a document's relevance to a query.

Computationally, this scoring function has a number of advantages. It allows real-time routing because it pushes much of the computation offline. In some implementations, the only component probability that needs to be computed at question time is $p(t|q)$. Computing $p(t|q)$ is equivalent to assigning topics to a question. In some implementations, the question analyzer 204 executes one or more probabilistic classifiers 216 on the question at question time. (The question analyzer is described further below.) The distribution $p(u_i|t)$ assigns users to topics, and the distribution $p(u_i|u_j)$ defines the social graph 224. Both of these can be computed by the crawler/indexer 227 and updated in the background as users answer questions. The component multiplications and sorting can also be performed at question time, but these are easily parallelizable.

A comprehensive knowledge base is important for search engines as question distributions tend to have a long tail. In corpus-based search engines, this is achieved by large-scale crawlers and thoughtful crawl policies. In the system 200, the knowledge base consists of people rather than documents, so the methods for acquiring and expanding a comprehensive knowledge base are quite different. The more active users there are, the more candidate answerers there are, and therefore the more comprehensive the coverage. More importantly, because the system 200 looks for answerers in a user's social affinity group, the denser the network is, the larger the effective knowledge base is. This suggests that the strategy for increasing the knowledge base of the system 200 involves creating a good experience for users so that they remain active and are inclined to invite their friends.

Given a set of active users on the system 200, the effective breadth of the knowledge base depends upon designing interfaces and algorithms that can collect and learn an extended topic list for each user over time. A central technical challenge is to select the right user to answer a given question from another user. In order to do this, the system 200 learns the following for each user $u_i$: (1) the topics t user $u_i$ might be able to answer questions about $p_{smoothed}(t|u_i)$; (2) the users $u_j$ to whom user $u_i$ is connected $p(u_i|u_j)$.

In various implementations, the system 200 computes the distribution $p(t|u_i)$ of topics known by user $u_i$ from one or more sources of information, such as those illustrated in TABLE 1, for example. In some implementations, the system can perform a topic strengthening algorithm at various times, the essential idea of which is: if a user has expertise in a topic and most of the members of the user's friends (e.g., members of the user's social affinity group having a small or null degree of social indirection from the user) also have some expertise in that topic, we have more confidence in that user's level of expertise than if the user were alone in his group with knowledge in that area. Mathematically, for some user m, m's group of friends U, and some topic t, if $p(t|u_i) \neq 0$, then $$s(t|u_i) = p(t|u_i) + \gamma \sum_{u \in U} p(t|u),$$

where $\gamma$ is a small constant. The s values can then be renormalized to form probabilities.

The system 200 can then perform smoothing algorithms the purpose of which are to record the possibility that the user may be able to answer questions about additional topics not explicitly associated with the user. One algorithm uses basic collaborative filtering techniques on topics (e.g., based on users with similar topics), another algorithm uses semantic similarity. In some implementations, semantic similarity is computed by using an approximation of distributional similarity computed over Wikipedia and other corpora; this serves as a proxy measure of the topics' semantic relatedness.

Once all of these bootstrap, extraction, and smoothing methods are applied, there is a list of topics and scores for a given user. Normalizing these topic scores so that $$\sum_{t \in T} p(t|u_i) = 1,$$

we have a probability distribution for topics known by user $u_i$. Using Bayes' Law, we compute for each topic and user:

$$p(u_i|t) = \frac{p(t|u_i)p(u_i)}{p(t)}, \quad (3)$$

using a uniform distribution for $p(u_i)$ and observed topic frequencies for $p(t)$. The system 200 collects these probabilities $p(u_i|t)$ indexed by topic into the inverted index 222, which allows for easy lookup when a question comes in.

The system 200 can compute the connectedness between users $p(u_i|u_j)$ in a number of ways. Social proximity (e.g., the degree of social indirection) and similarities in demographics and behavior among members of the user's social affinity network can be taken into account. By way of illustration, the factors considered can include one more of the following:

Social connections (common friends and affiliations)
Demographic similarity
Profile similarity (e.g., common favorite movies)
Vocabulary match (e.g., instant messaging shortcuts)
Chattiness match (e.g., frequency of follow-up messages)
Verbosity match (e.g., the average length of messages)
Politeness match (e.g., use of "Thanks!")
Speed match (e.g., responsiveness to other users)
Connection strengths between members of a social affinity group can be computed using, for example, a weighted cosine similarity over this feature set, normalized so that $$\sum_{u_i \in U} p(u_i|u_j) = 1,$$

and stored in the social graph 224 for quick access at question time. Both the distributions $p(u_i|u_j)$ in the social graph 224 and $p(t|u_i)$ in the inverted index 222 can be updated as users interact with one another.

The question analyzer 204 determines a scored list of topics $p(t|q)$ for each question q representing the semantic subject matter of the question. In some implementations, this is the only probability distribution in equation (2) that is computed at question time. The role of the question analyzer 204 is to learn enough about the question that it may be sent to appropriately interested and knowledgeable human answerers.

In various implementations, the one or more of the classifiers 216 in TABLE 2 can be run on each question. Other classifiers are possible.

TABLE 2

| Classifier | Description |
| --- | --- |
| Non-Question Classifier | This classifier determines if the input is not actually a question (e.g., is it a misdirected message, a sequence of keywords, etc.); if so, the user is asked to submit a new question. |
| Inappropriate Question Classifier | This classifier determines if the input is obscene, commercial spam, or otherwise inappropriate content for a public question-answering community; if so, the user is warned and asked to submit a new question. |
| Trivial Question Classifier | This classifier determines if the input is a simple factual question which can be easily answered by existing common services (e.g., "What time is it now?", "What is the weather?", etc.); if so, the user is offered an automatically generated answer resulting from traditional web search. |
| Location Sensitive Classifier | This classifier determines if the input is a question which requires knowledge of a particular location, usually in addition to specific topical knowledge (e.g., "What's a great sushi restaurant in Austin, TX?"); if so, the relevant location is determined and passed along to the routing engine 208 with the question. |

The list of topics relevant to a question can then be produced by merging the output of one or more distinct topic mapper algorithms, each of which suggests its own scored list of topics. One or more of the topic mappers described in TABLE 3 can be used. Other topic mappers are possible.

TABLE 3

| Topic Mapper | Description |
| --- | --- |
| Keyword Match | This passes any terms in the question which are matches with topics associated with a user through a classifier which is trained to determine whether a given match is likely to be semantically significant or misleading. For example, if the string "camel wrestling" occurs in a question, it is likely to be semantically relevant to a user who has "camel wrestling" as a profile topic; whereas the string "running" may be too ambiguous to use in this manner without further validation, since it might errantly route a question about "running a business" to a user who knows about fitness. |
| Taxonomy | This classifies the question text into a taxonomy of popular question topics using an SVM trained on an annotated corpus of several millions questions. |
| Salient Term | This extracts salient phrases from the question-using a noun-phrase chunker and a tf-idf-based measure of importance-and finds semantically similar user topics. |
| User Tag | This takes any user "tags" provided by the asker (or by any would-be answerers), and maps these to semantically-similar user topics. |

In various implementations, the output distributions of the topic mappers can be combined by weighted linear combination. Other ways of combining the output distributions are possible.

Ranking is performed by the routing engine 208 which determines an ordered list of users (or "candidate answerers") who should be contacted to answer a question given the asker of the question and the information about the question derived by the question analyzer 204. The core ranking function is, in some implementations, equation (2); the routing engine 208 can compute equation (2) for candidate answerers and sort the candidate answerers according to their scores. In various implementations, factors that can determine this ranking of users are Topic Expertise $p(u_i|q)$, Connectedness $p(u_i|j_i)$, and Availability.

Topic Expertise: The routing engine 208 finds the subset of users who are semantic matches to the question: those users whose associated topics indicate expertise relevant to the topics which the question is about. Users whose associated topics are closer matches to the question's topics are given higher rank. For questions which are location-sensitive, only users with matching locations in their profiles are considered.

Connectedness: Second, the routing engine 208 scores each user according to the degree to which the user—as a person, independently of their topical expertise—is a good "match" for the asker for this information question. The goal of this scoring is to optimize the degree to which the asker and the answerer feel kinship and trust, arising from their sense of connection and similarity, and meet each other's expectations for conversational behavior in the interaction.

Availability: Third, the routing engine 208 prioritizes candidate answerers in such a way so as to optimize the chances that the present question will be answered, while also preserving the available set of answerers as much as possible by spreading out the answering load across the user base. This involves factors such as prioritizing users who are currently online (e.g., via instant messaging presence data, smart phone usage, and so on), who are historically active at the present time-of-day, and who have not been contacted recently with a request to answer a question.

The routing engine 208 process can be parallelized such that each shard in the inverted index 222 computes its own ranking for users in that shard, and sends the top users to the routing engine 208. This is scalable as the user base grows, since as more users are added, more shards can be added.

Given this ordered list of candidate answerers, the routing engine 208 can in some implementations filter out candidate answerers who should not be contacted according to guidelines for preserving a high-quality user experience. These filters operate largely as a set of rules: do not contact users who prefer to not be contacted at the present time of day; do not contact users who have recently been contacted as many times as their contact frequency settings permit; and so on. The ordered list of candidate answerers who survive this filtering process are returned to the conversation manager 206. The conversation manager 206 then proceeds to contact one or more candidate answerers inquiring as to whether they would like to answer the present question and continuing until an answer is provided and returned to the asker.

In some implementations, the system 200 includes a search result processor 210. The search result processor 210 identifies previously submitted answers in a question and answer archive 218 that are relevant to a search query and provides them to invoking processes (e.g., search engines). The archive 218 is a store of previously submitted questions and corresponding answers that have been routed through the conversation manager 206. The archive 218 can be indexed by topic and by words or n-grams that appear in the answers, for example. (An n-gram is a subsequence of n items from a given sequence. The items in question can be phonemes, syllables, letters, words or base pairs.) In further implementations, the archive 218 can include other content from sources such as blog posts and micro blog posts. The other content can be identified and provided in a similar fashion to answers. A search query, such as a search query submitted by a user to a search engine, is received by search result processor 210. The search result processor 210 identifies one or more answers (or other content) in the archive 218 that are relevant to the search query and returns these to the invoking process. The search result processor 210 determines one or more topics for the search query based on the text of the search query. Topics can be determined, for example, as described above in regards to the question analyzer 204. Likewise, one or more topics can be determined for each answer in the archive 218 ahead of time using similar or different techniques. The relatedness of a search query's topics to an answer's topics can be determined in a number of different ways. The presence of keywords in a search query can be used to identify questions and answexs that have the same keywords, for instance. In addition, the presence of a URL in an answer that is included in a result set that a search engine would return for the search query can indicate relatedness of the answer to the search query. In further implementations, the archived answers can be ranked according to relevance to a search particular query.

Other ways of determining the similarity between a search query and an answer are possible including, for instance, basing similarity on a similarity of n-grams in the search query and the answer rather than topics. The search result processor 210 can provide a relevance score for each identified answer that indicates how relevant the answer is to the search query. This score can be derived from the determined similarity of an answer to the search query, for example. An answer's relevance score can be used by the invoking process to determine a rank of an answer in a listing of search results for the search query. In some implementations, the system 200 includes an affiliate link generator 212.

The affiliate link generator 212 adds affiliate links to answers (or other content) that are provided by the conversation manager 206 to askers or by the search result processor 210 to invoking processes. In some implementations, the affiliate link generator 212 can add an affiliate link to an answer for one or more identified entities in the answer for which the system has affiliate tags. As described above, affiliate tags allow merchants to identify the website or software application of origin for users who execute a purchase and compensate the associated affiliate. In various implementations, the affiliate tag includes a unique identifier of the affiliate (e.g., assigned upon enrollment) and, optionally, the unique identifier of the selected product or service. An entity can be referred to by natural language text or the entity can be referred to by a URL, for example. Entities can be identified in an answer (or other content) by textually searching for URLs, product names, service names, or company names in the answer (or other content) that match names for which the system 200 has an entity tags. The matching does not have to be exact: synonyms, misspellings, and filler text can be taking into account and compensated for in the text matching algorithm. Other ways of identifying entities in text are possible.

In other implementations, the affiliate link generator 212 can add an affiliate link to an answer for one or more identified entities in the answer for which the system has affiliate tags only if the corresponding question appears to be seeking a recommendation for a product or service. A question can be classified according to its syntax and the presence of certain keywords or punctuation. For example, the sentences in a question could be classified as questions or non-questions according to the presence of a question mark at the end of the sentence or the appearance at the beginning of "who", "what", "when", "where", "does", "why", and so on. Further classification could be effected by monitoring subjective keywords within question such as "best", "good", and so on. More detailed classification may be performed by constructing statistical language models or supervised classifiers based on training sets. The training sets may contain hits, wherein a recommendation seeker receives an answer containing an entity, and misses wherein the answer does not contain such.

Figure 3:
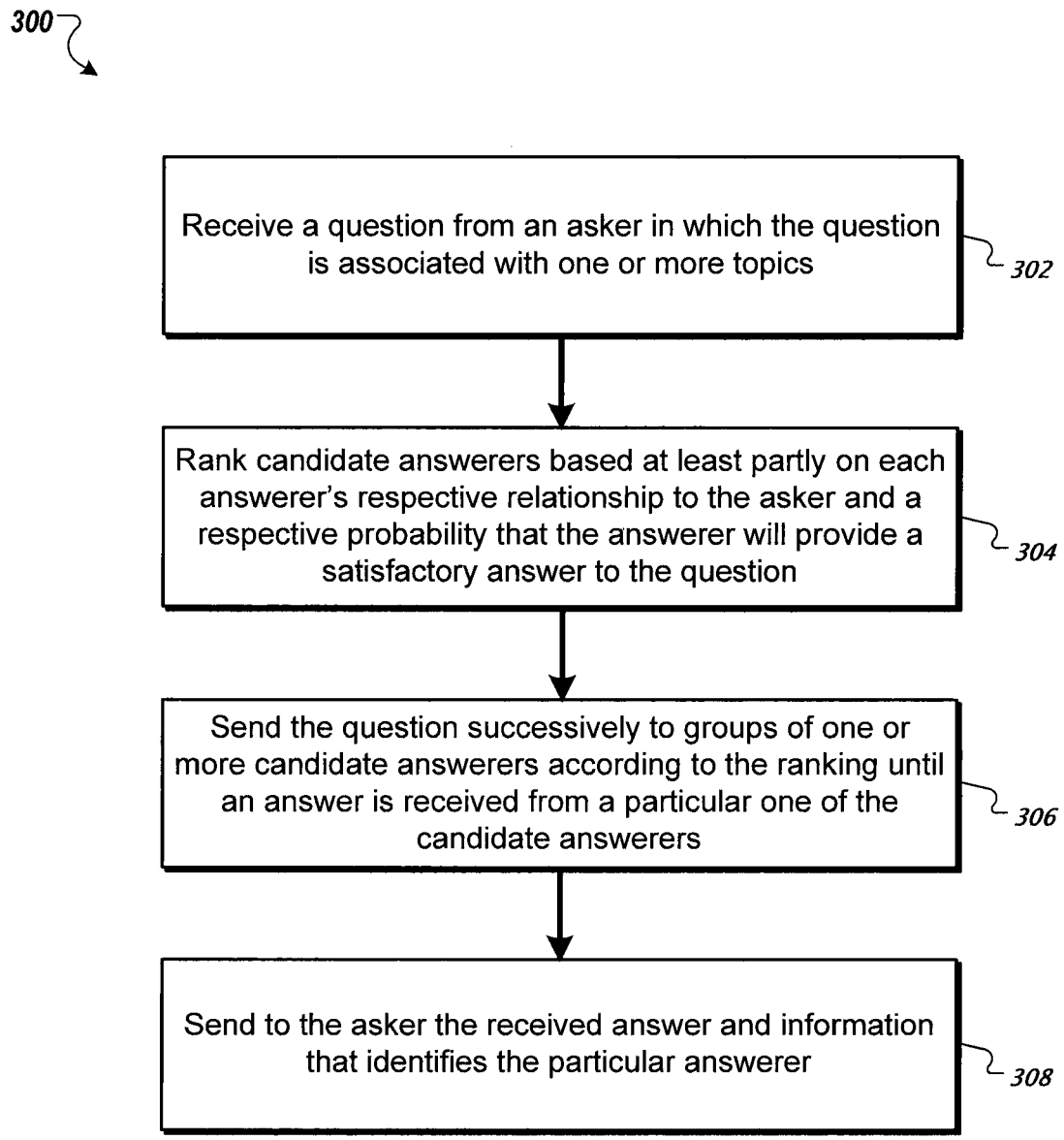
FIG. 3 is a flowchart of an example technique for providing a question to an answerer.

FIG. 3 is a flowchart of an example technique for providing a question to an answerer. A question is received, e.g., by the conversation manager 206, from an asker in which the question is associated with one or more topics (302). The topics can be determined by the question analyzer 204, for example. Candidate answerers are ranked, e.g., by the routing engine 208, based at least partly on each answerer's respective relationship to the asker and a respective probability that the answerer will provide a satisfactory answer to the question (304). The question is sent successively to groups of one or more candidate answerers, e.g., by the conversation manager 206, according to the ranking until an answer is received from a particular one of the candidate answerers (306). The received answer is then sent to the asker, e.g., by the conversation manager 206, in which the answer includes information that identifies the particular answerer (308).

Figure 4:
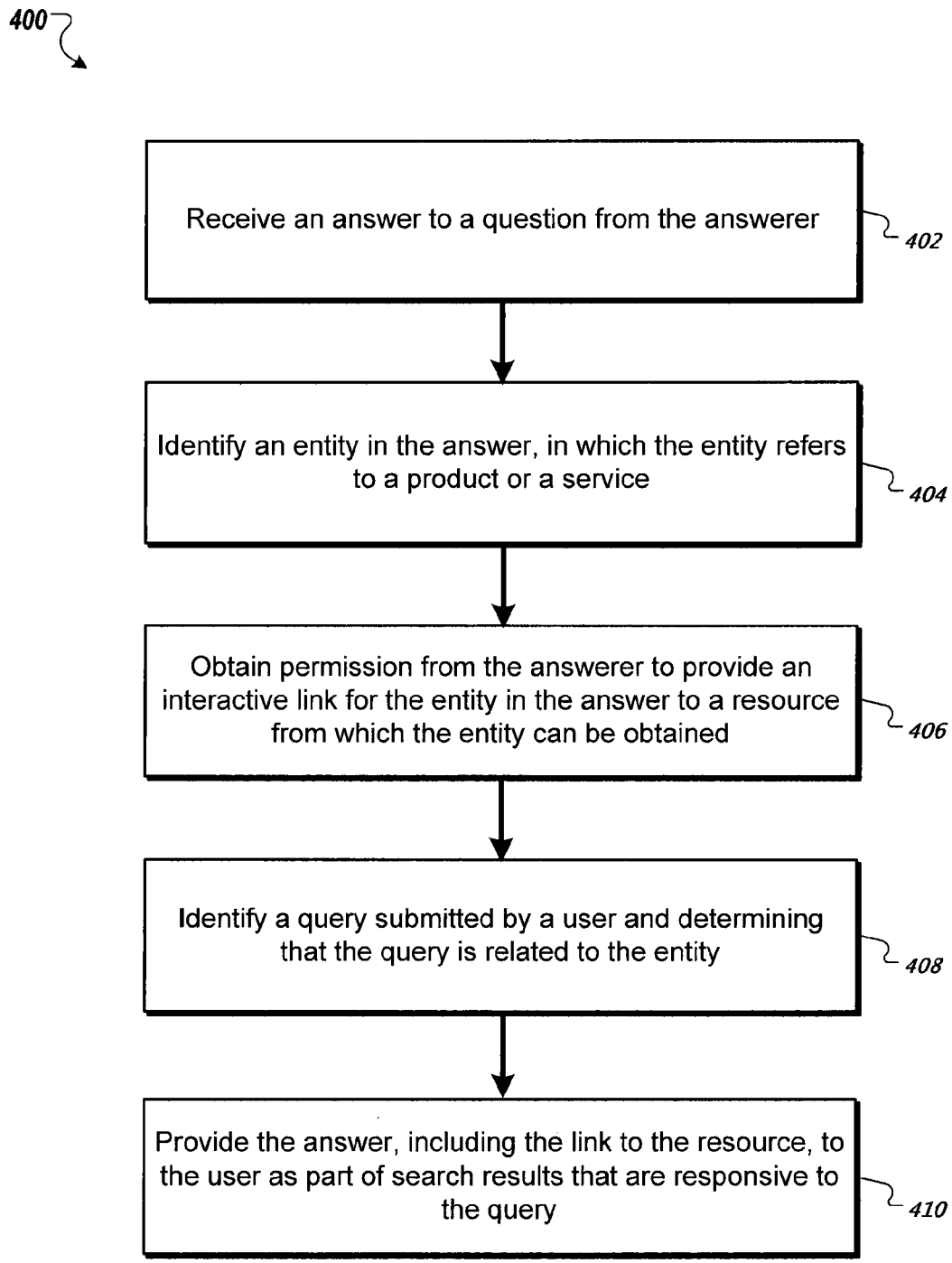
FIG. 4 is a flowchart of an example technique for providing an affiliate link in an answer.

FIG. 4 is a flowchart of an example technique for providing an affiliate link in an answer. An answer to a question is received from an answerer, e.g., by the conversation manager 206 (402). An entity is identified in the answer, e.g., by the affiliate link generator 212, in which the entity refers to a product or a service (404). Permission is obtained from the answerer, e.g., by the conversation manager, to provide an interactive link for the entity in the answer to a resource from which the entity can be obtained (406). A query submitted by a user is received, e.g., by the search result processor 210, and it is determined whether query is related to the entity (408). An answer is provided, e.g., by the search result processor 210, including the link to the resource, as part of search results that are responsive to the query.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In further implementations, the system can match users based on existing content on the web rather than questions or answers submitted directly to the system. By way of example, the system can initiate a conversation between two users where one had posted a question on one forum but there was a candidate answerer who had written on relevant topics on another forum. The system might also give the questioner more visibility into the types of users that might receive the question and allow the asker to take more control over who might see the question and who would be barred from seeing the question. For example, an asker might be given the option of saying send this to users such as their professors but not to friends of someone they are dating.

What is claimed is:

1. A method implemented by data processing apparatus, the method comprising:

receiving an answer to a question wherein the question was submitted by a user to a system, and wherein the answer was submitted to the system by an answerer that is a member of a social network of the user in response to the question;

identifying an entity in content of the answer, in which the entity refers to a product, a service, a company, or a merchant;

requesting permission from the answerer to provide an interactive link with the answer wherein the interactive link is a link to a resource for the entity that is configured to cause presentation of the resource when selected;

after requesting permission, receiving input from the answerer granting permission to provide the interactive link with the answer;

after receiving input from the answerer granting permission:

receiving a user submitted query and determining that the query is related to the entity; and responsive to receiving the user submitted query, providing the answer, including the interactive link to the resource, as a search result of a plurality of search results that are responsive to the query.

2. The method of claim 1 wherein identifying the entity in content of the answer further comprises using a trained classifier to determine if the content refers to an entity.

3. The method of claim 1 wherein requesting permission from the answerer further comprises providing one or more options to the answerer wherein one of the options is to include the interactive link.

4. The method of claim 3, wherein input from the answerer granting permission results from user selection of the option to include the interactive link.

5. The method of claim 1 wherein the resource is a website or an application.

6. The method of claim 1 wherein the interactive link is a hyperlink.

7. The method of claim 1 wherein the interactive link includes an affiliate code.

8. The method of claim 7 wherein the affiliate code is used by the resource to identify an account.

9. The method of claim 7 wherein the account receives credit if the entity is purchased.

10. The method of claim 1 wherein the provided answer includes an identity of the answerer.

11. The method of claim 1 wherein the resource is a website or an application.

12. The method of claim 1 wherein providing the answer further comprising including a map, an image or a video with the answer.

13. A system comprising:
a computer-readable medium including instructions; and
data processing apparatus coupled to the computer-readable medium and able to execute the instructions to perform operations comprising:
receiving an answer to a question wherein the question was submitted by a user to a system, and wherein the answer was submitted to the system by an answerer that is a member of a social network of the user in response to the question;
identifying an entity in content of the answer, in which the entity refers to a product, a service, a company, or a merchant;
requesting permission from the answerer to provide an interactive link with the answer wherein the interactive link is a link to a resource for the entity that is configured to cause presentation of the resource when selected;
after requesting permission, receiving input from the answerer granting permission to provide the interactive link with the answer
after receiving input from the answerer granting permission:
receiving a user submitted query and determining that the query is related to the entity; and
responsive to receiving the user submitted query, providing the answer, including the interactive link to the resource, as a search result of a plurality of search results that are responsive to the query.

14. The system of claim 13 wherein identifying the entity in content of the answer further comprises using a trained classifier to determine if the content refers to an entity.

15. The system of claim 13 wherein requesting permission from the answerer further comprises providing one or more options to the answerer wherein one of the options is to include the interactive link.

16. The system of claim 15, wherein input from the answerer granting permission results from user selection of the option to include the interactive link.

17. The system of claim 13 wherein the resource is a website or an application.

18. The system of claim 13 wherein the interactive link is a hyperlink.

19. The system of claim 13 wherein the interactive link includes an affiliate code.

20. The system of claim 19 wherein the affiliate code is used by the resource to identify an account.

21. The system of claim 19 wherein the account receives credit if the entity is purchased.

22. The system of claim 13 wherein the provided answer includes an identity of the answerer.

23. The system of claim 13 wherein the resource is a website or an application.

24. The system of claim 13 wherein providing the answer further comprising including a map, an image or a video with the answer.

25. A computer-readable medium including instructions operable to cause data processing apparatus to perform operations comprising:
receiving an answer to a question wherein the question was submitted by a user to a system, and wherein the answer was submitted to the system by an answerer that is a member of a social network of the user in response to the question;
identifying an entity in content of the answer, in which the entity refers to a product, a service, a company, or a merchant;
requesting permission from the answerer to provide an interactive link with the answer wherein the interactive link is a link to a resource for the entity that is configured to cause presentation of the resource when selected;
after requesting permission, receiving input from the answerer granting permission to provide the interactive link with the answer;
after receiving input from the answerer granting permission
receiving a user submitted query and determining that the query is related to the entity; and
responsive to receiving the user submitted query, providing the answer, including the interactive link to the resource, as a search result of a plurality of search results that are responsive to the query.

* * * * *

UNITED STATES PATENT AND TRADEMARK OFFICE
CERTIFICATE OF CORRECTION

| | | |
|---|---|---|
| PATENT NO. | : 8,515,888 B2 | |
| APPLICATION NO. | : 12/915654 | |
| DATED | : August 20, 2013 | |
| INVENTOR(S) | : Max Ventilla | |

It is certified that error appears in the above-identified patent and that said Letters Patent is hereby corrected as shown below:

In the Claims

Column 21, line 5, in Claim 4, delete "claim 3," and insert -- claim 3 --.

Column 22, line 8, in Claim 16, delete "claim 15," and insert -- claim 15 --.

Signed and Sealed this
Nineteenth Day of November, 2013

Teresa Stanek Rea
*Deputy Director of the United States Patent and Trademark Office*